US010671068B1

(12) United States Patent
Xu et al.

(10) Patent No.: US 10,671,068 B1
(45) Date of Patent: Jun. 2, 2020

(54) SHARED SENSOR DATA ACROSS SENSOR PROCESSING PIPELINES

(71) Applicant: Apple Inc., Cupertino, CA (US)

(72) Inventors: Xinyu Xu, Cupertino, CA (US);
Ahmad Al-Dahle, San Jose, CA (US);
Kshitiz Garg, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 15/709,404

(22) Filed: Sep. 19, 2017

Related U.S. Application Data

(60) Provisional application No. 62/397,458, filed on Sep. 21, 2016.

(51) Int. Cl.

| | | |
|---|---|---|
| G05D 1/00 | (2006.01) | |
| G05D 1/02 | (2020.01) | |
| G01S 17/08 | (2006.01) | |
| G06N 5/04 | (2006.01) | |
| G06N 20/00 | (2019.01) | |
| G01S 17/931 | (2020.01) | |

(52) U.S. Cl.
CPC .......... *G05D 1/0088* (2013.01); *G01S 17/08* (2013.01); *G01S 17/931* (2020.01); *G05D 1/0212* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | |
|---|---|---|
| 6,445,983 B1 | 9/2002 | Dickson et al. |
| 6,889,171 B2 | 5/2005 | Skrbina et al. |
| 7,283,904 B2 | 10/2007 | Benjamin et al. |
| 9,183,459 B1 | 11/2015 | Zhang et al. |
| 9,224,053 B1 | 12/2015 | Ferguson et al. |
| 9,664,510 B2 | 5/2017 | Nathan et al. |
| 2003/0078754 A1 | 4/2003 | Hamza |
| 2006/0080328 A1 | 4/2006 | Anderson |
| 2006/0120609 A1 | 6/2006 | Ivanov et al. |
| 2008/0195304 A1 | 8/2008 | Krishnaswamy |
| 2009/0322871 A1 | 12/2009 | Ji et al. |
| 2014/0067748 A1 | 3/2014 | Dubberley et al. |

(Continued)

OTHER PUBLICATIONS

U.S. Appl. No. 15/275,199, filed Sep. 23, 2016, Kshitiz Garg.

*Primary Examiner* — Jonathan M Dager
*Assistant Examiner* — Garrett F Evans
(74) *Attorney, Agent, or Firm* — Robert C. Kowert; Kowert, Hood, Munyon, Rankin & Goetzel, P.C.

(57) ABSTRACT

Sensor data captured at by different sensors may be shared across different sensor processing pipelines. Sensor processing pipelines may process captured sensor data from respective sensors. Some of the sensor data that is received or processed at one sensor data processing pipeline may be provided to another sensor data processing pipeline so that subsequent processing stages at the recipient sensor processing pipeline may process the combined sensor data in order to determine a perception decision. Different types of sensor data may be shared, including raw sensor data, processed sensor data, or data derived from sensor data. A control system may perform control actions based on the perception decisions determined by the sensor processing pipelines that share sensor data.

20 Claims, 7 Drawing Sheets

(56) References Cited

U.S. PATENT DOCUMENTS

| | | |
|---|---|---|
| 2015/0363706 A1 | 12/2015 | Huber et al. |
| 2016/0180197 A1 | 6/2016 | Kim et al. |
| 2017/0371329 A1* | 12/2017 | Giering .............. G05B 23/0254 |
| 2018/0165828 A1* | 6/2018 | Sasatani .................... G06T 7/70 |

* cited by examiner

SHARED SENSOR DATA ACROSS SENSOR PROCESSING PIPELINES

This application claims benefit of priority to U.S. Provisional Application No. 62/397,458, filed Sep. 21, 2016, titled "Shared Sensor Data Across Sensor Processing Pipelines," which is hereby incorporated by reference in its entirety.

BACKGROUND

Perception techniques are applied to sensor data collected for an environment in order to understand what objects are present in the environment, where the objects are located in the environment, and how these objects move or change within the environment. Because multiple sensors are often employed to collect sensor data in different modalities, sensor data may offer a rich data set to analyze when performing perception tasks. Therefore, the collected sensor data may produce different perception decisions dependent upon the type of sensor data that is evaluated. Consumers of perception decisions, such as control systems that respond to changes in the environment by directing various control actions of system resources, may leverage the multiplicity of perception decisions to determine the control actions that are performed.

SUMMARY

Multiple sensors may be implemented that collect different sensor data. The different sensor data may be processed via different processing pipelines that determine a perception decision based on the captured sensor data. Sensor data may be shared among multiple processing pipelines at different stages of the processing pipelines prior to determining a perception decision. In this way, combined sensor data may be processed by some processing pipelines to reach a perception decision for the processing pipeline. The perception decisions of the different processing pipelines may also be combined to generate a final perception decision.

Figure 1:
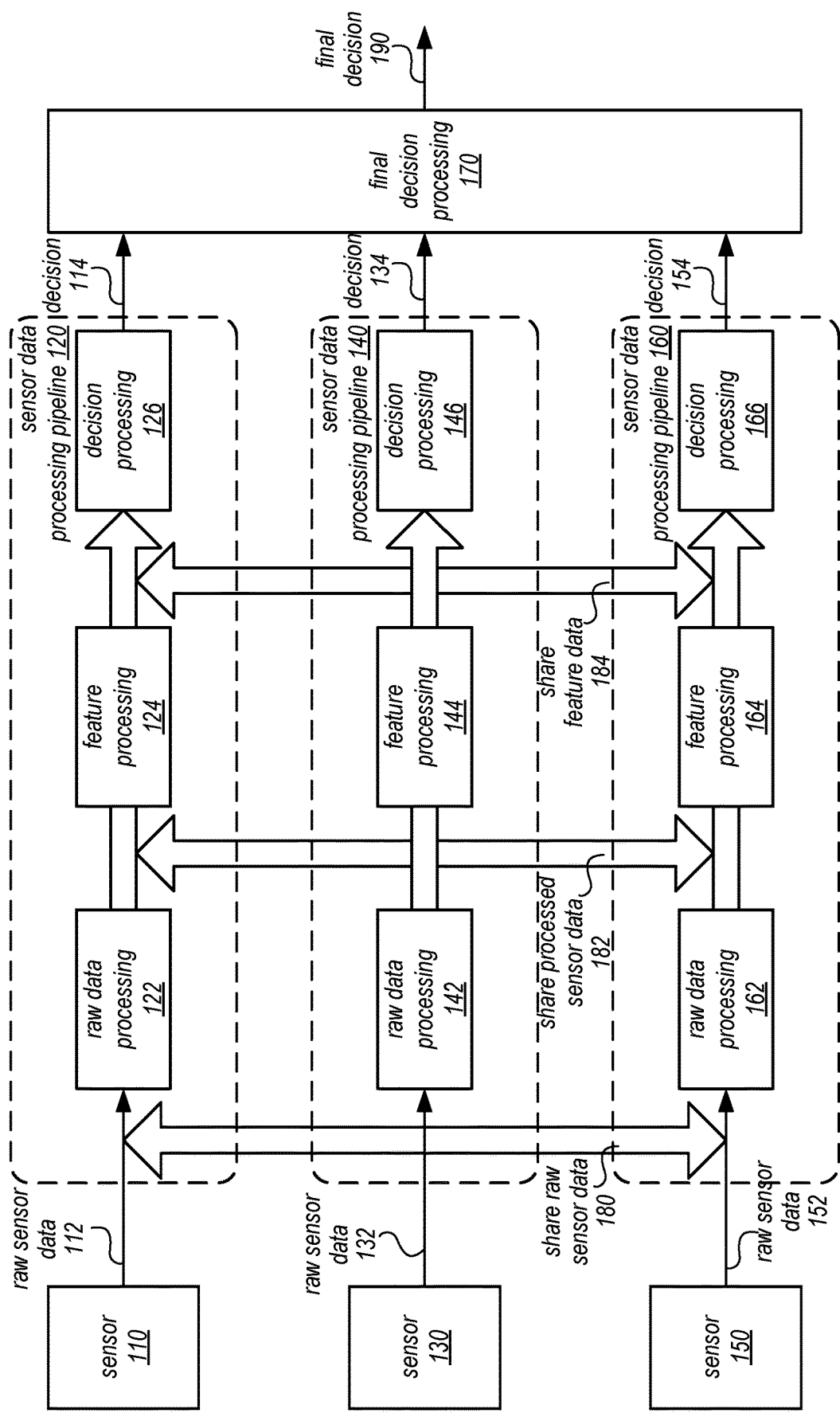
FIG. 1 is a logical block diagram illustrating shared sensor data across processing pipelines, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described here may implement shared sensor data across processing pipelines. Different sensors may be used to capture sensor data describing an environment. In some circumstances, the captured sensor data is redundant, describing a same or overlapping portion of an environment described by sensor data captured by another sensor. For example, a passive sensor, such as an image sensor, may capture image data that includes one or multiple objects in the environment while an active sensor, such as a light detection and ranging device (LiDAR) may determine distance measures from the sensor to the same objects in the environment. The image data and the distance measures may be redundant in that they describe the same portion of the environment, the objects.

Consumers of sensor data, such as control systems like control system 200 discussed below with regard to FIG. 2, may use captured sensor data to take actions based on determinations made about the environment. For instance, a control system may implement perception techniques to detect, classify, and track objects in an environment in order to choose which actions to perform. Thus, consumers of sensor data can make perception decisions about the environment according to the sensor data captured by the sensors. However, not all sensor data is equally useful in making perception decisions in different contexts. For example, image sensors, while capturing a high resolution of sensor data, may provide very little useful sensor data in low-light scenarios, as the image data may not be able to distinguish objects within the environment, while a LiDAR sensor may have good low light capabilities even though the sensor data the LiDAR collects may be sparse. Because different sensors can capture redundant information (e.g., like the image sensor and LiDAR example above), fusion techniques are sometimes implemented to leverage the strengths of different sensors in different scenarios.

Typically fusion techniques are implemented to combine the decisions made by independent processing pipelines for the different sensor data to reach a final decision. However, the differences between the decisions made based on different sensor data may vary widely, resulting in conflicting decisions that are difficult to adjudicate. Sharing sensor data amongst sensor data processing pipelines at earlier stages may allow for the strengths of one type of sensor data to help correct the weaknesses of another type of sensor data and/or may optimize the performance sensor data processing and decision-making within the processing pipeline. For example, as discussed below with regard to FIG. 4, LiDAR sensor data may be shared with processing pipelines for image data in order to perform feature extraction techniques and image sensor data, such as the features extracted from image sensor data may be use to generate classification decisions that are shared with a processing pipeline for LiDAR data in order to make combined classification decisions.

Sharing sensor data across processing pipelines may provide built-in redundancy to handle sensor failures, as different processing pipelines may still receive some sensor data upon which processing may continue. Moreover, sharing sensor data may allow for different perception techniques, such as techniques that perform object detection, classification, and tracking within an environment, to be performed based on multiple sensor modalities. FIG. 1 is a logical block diagram illustrating shared sensor data across processing pipelines, according to some embodiments.

Different types of sensors, such as sensors 110, 130, and 150, may be radars, ultrasonic sensors, light beam scanning devices, visible light camera devices (e.g., monocular, stereo, or trinocular video cameras), infrared camera devices (e.g., near-infrared or far-infrared, near-infrared camera devices, depth camera devices which can include one or more light-scanning devices, including LiDAR devices, location sensors (e.g., global positioning satellite (GPS) or Differential GPS (DGPS)), or inertial measurement sensors (e.g., accelerometers, speedometers, odometers, and angular rate sensors, like gyroscopes). These sensors may capture and provide raw sensor data, such as raw sensor data 112, 132, and 152, to respective sensor data processing pipelines, such as sensor data processing pipelines 120, 140, and 160. In turn these sensor data processing pipelines may make perception decisions, such as detecting, classifying, or tracking an object in an environment monitored by the sensor. Final decision processing 170 may determine a final decision based on decisions received from individual sensor data processing pipelines, such as decisions 114, 134, and 154 to determine a final perception decision 190.

Sensor data processing pipelines 110, 130, and 150 may be implemented on one or more computing devices, including computing devices such as computer system 700 in FIG. 7 below, and/or any other combination of processing devices, including general purpose CPUs, graphical processing units (GPUs), dedicated circuitry, such as an application specific integrated circuit (ASIC) or field programmable gate array (FPGA), as well as various interconnects, including various interconnects implementing peripheral component interconnect (PCI) or PCI express (PCIe) or Ethernet communications. Different processing stages may be implemented by one or more components or sub-stages within sensor data processing pipelines to perform different types of processing on sensor data in the processing pipeline. For example, a raw data processing stage, such as raw data processing 122, 142, and 162, may be implemented as part of a sensor data processing pipeline to transform raw sensor data received as signals into a particular data format, such as buffering image data into frames, patches, regions, or windows for processing or collecting a group of distance measures for subsequent processing. Another example of a processing stage implemented as part of a sensor data processing pipeline may be a feature processing stage, such as feature processing stages 124, 144, and 164. A feature processing stage may, for example perform feature detection and extraction (e.g., by detecting and locating edges, corners, or colors in sensor data). Sensor data processing pipelines may also implement a decision processing stage, such as decision processing stages 126, 146, and 166. Decision processing stages may apply perception techniques (e.g., to detect, classify, or track objects in an environment) based on the features extracted in previous stages, such as feature processing stages 124, 144, and 164.

In addition to processing the sensor data received directly from a corresponding sensor at the sensor data processing pipeline, other sensor data (e.g., including raw sensor data or data derived from the raw sensor data via subsequent processing at sensor data processing pipelines) may be provided by other processing pipelines in order to obtain leverage the different characteristics sensor data from other modalities may provide. For example, as illustrated in FIG. 1, raw sensor data may be shared 180 by one or more of the sensor data processing pipelines with another one or more sensor data processing pipelines. In this way, sensor data that has not been pre-processed (e.g., down-sampled, reformatted, or modified in any fashion) can be used in evaluations or processing with other raw sensor data (e.g., at raw data processing stages or at a subsequent processing stage). Processed sensor data may also be shared 182 amongst sensor data processing pipelines, as well as other data derived from sensor data, such as shared feature data 184. In this way, feature level fusion may be performed so that perception decisions made by a processing pipeline, such as perception decisions made at decision processing stages 126, 146, and 166, can account for or leverage information captured by features from other sensors.

Final decision processing 170 may fuse decisions made by individual processing pipelines, such as decisions 114, 134, and 154, in order to make a final decision that accounts for the strengths or varying information provided by different sensor modalities. In some embodiments, final decision processing may implement a voting scheme or weighting scheme to select the final decision 190 based on the input decisions. In some embodiments, the input decisions may be accompanied with confidence values or other information which allow final decision processing to select a decision based on the confidence of the different processing pipelines. Once determined final decision processing 170 may provide the final decision 190 to various other control system components that may determine responsive actions based on the final decision 190. For example, an autonomous navigation control system, such as discussed below with regard to FIG. 3, may determine that a final decision indicating that a detected object is a pedestrian is within a vehicle driving route and direct automatic braking to prevent a collision with the pedestrian.

Note that different configurations of sensor data processing pipelines, sensor data sharing, and sensors may be implemented. For example, some sensor data processing pipelines may only share certain sensor data with other specific sensor data processing pipelines (e.g., raw, processed, or feature sensor data), and/or at specific stages in the sensor data procession pipelines (raw processing, feature processing, or decision processing).

Next, the specification describes a control system that may receive sensor data from different sensors and share sensor data across processing pipelines. An example control system, providing autonomous navigation for a vehicle is then described. Various examples of components or configurations of control systems that implement shared sensor data across processing pipelines may then be discussed. Flow charts describing various methods and techniques to implement shared sensor data across processing pipelines are then described. Finally, a description of an example computing system upon which the various components, modules, systems, devices, and/or nodes may be implemented is provided. Various examples are provided throughout the specification.

Control systems may operate within various environments to control or direct the actions of system resources within the environment. Control systems, for example, often rely upon data provided from various sensors in order to make management or operational decisions to control system resources. Control systems may be implemented in many different scenarios. For example, some control systems may be implemented as part of production or materials handling facilities, directing the performance of individual processes or a workflow across an entire facility. In such scenarios, data received from sensors or other data producers may be used to automate safety related operations, work-in-progress controls, manufacturing or material processing functions or many other facility operations. Control systems may also be implemented as part of individual machines to automate the operation or functions of the individual machine (e.g., starting, stopping, or changing operations). In some embodiments, control systems may be implemented as part of vehicles to provide automated control of various vehicle functions, such as discussed below with regard to FIG. 3.

Control systems may be implemented in various ways. FIG. 2 illustrates a logical block diagram of a control system that perform sensor data processing using shared sensor data across processing pipelines, according to some embodiments. In various embodiments, the components illustrated in FIG. 2 may be implemented directly within computer hardware, as instructions directly or indirectly executable by computer hardware (e.g., a microprocessor, dedicated circuitry, or computer system), or using a combination of these techniques. For example, the components of FIG. 2 may be implemented by a system that includes a number of computing nodes (or simply, nodes), each of which may be similar to the computer system embodiment illustrated in FIG. 7 and described below.

Control system 200 may manage various system resource(s) 240. As noted above, system resource(s) 240 can be controls, sub-systems, or other components implemented in large-scale control system environments to control sub-systems or other components implemented as part of individual machines or vehicles (e.g., control elements of a vehicle) that may be automatically managed or directed by control system 210 according to control actions 222. Control system 210 may implement control engine 220 in order to direct operation of system resource(s) 240 according to various rules, knowledge bases, procedures, or other decision making techniques. In order to make operational decisions, control system 200 may implement data sensor data processing 210 to evaluate sensor data received from various sensors, such as sensors 230, which provide raw sensor data 202 to sensor data processing 210. For example, data processing 212 may parse, aggregate, and/or evaluate received sensor data in order to perform various perception tasks, such as identifying or detecting objects, conditions, or scenarios in the environment, tracking the objects, conditions, or scenarios, and classifying the objects, conditions, or scenarios.

Sensor data processing 210 may implement various sensor data processing pipelines, as discussed above with regard to FIG. 1 or below with regard to FIG. 4. For example, for each sensor 230, sensor data processing 210 may implement a sensor data processing pipeline to determine a perception decision based on the sensor data captured by that sensor 230. The sensor data processing pipelines may share sensor data, such as raw sensor data or sensor data that has been processed at various stages prior to making a perception decision. The perception decisions of the multiple sensor data processing pipelines may be fused and evaluated to make a single, final perception decision 212 which may be provided to control engine 220 to evaluate with respect to the various control actions that should or should not be taken in consideration of the received decisions 212.

Figure 3:
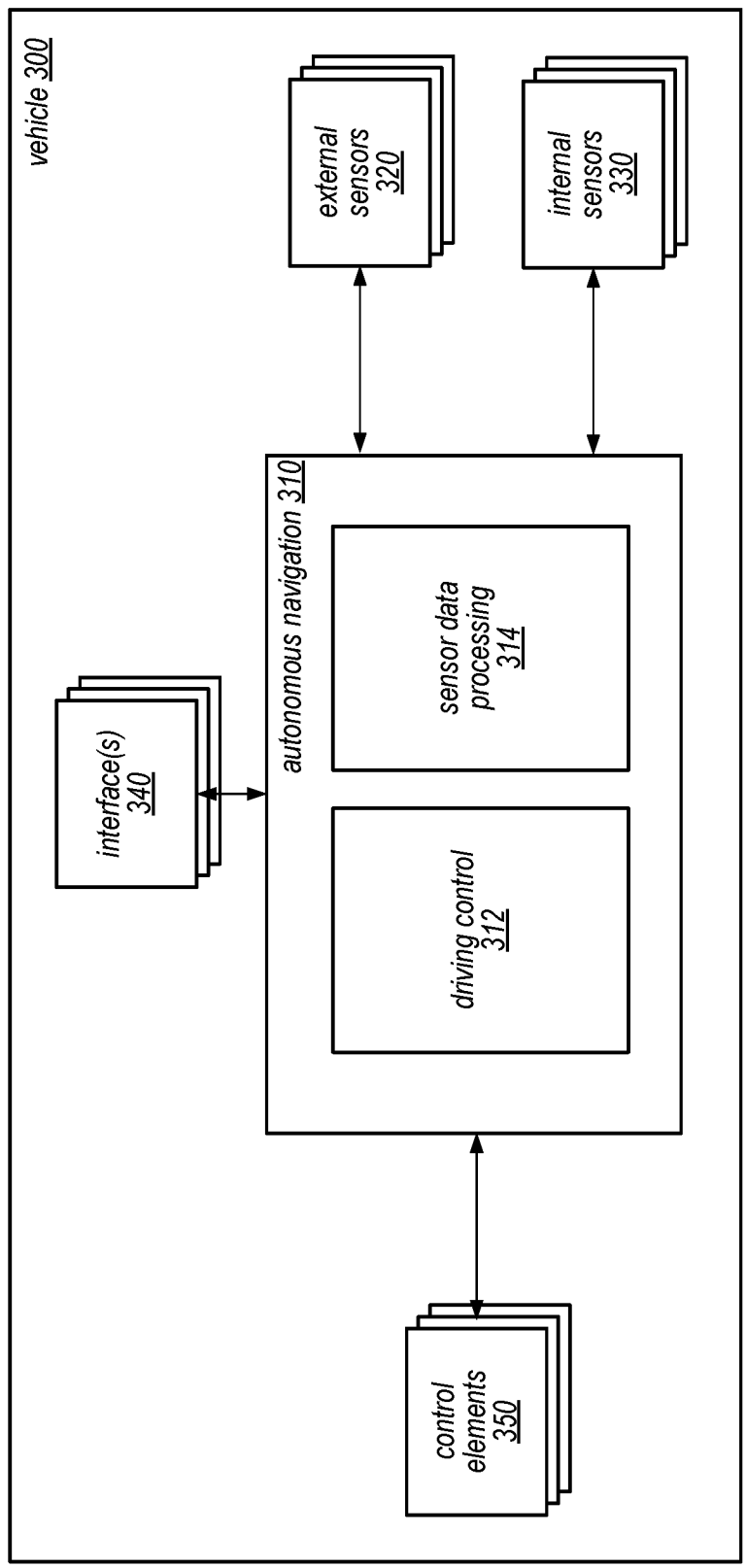
FIG. 3 illustrates a logical block diagram of a control system that performs autonomous navigation for a vehicle using shared sensor data across processing pipelines, according to some embodiments.

One example of a control system that processes data received from different sensors is an autonomous navigation system. FIG. 3 illustrates a logical block diagram of a control system that performs autonomous navigation for a vehicle using shared sensor data across processing pipelines, according to some embodiments. Autonomous navigation 310 may be implemented in a vehicle 300 which can be "unmanned" or accommodate one or more occupants, including one or more of a land vehicle (e.g., an automobile, truck, or van) aircraft, or watercraft. Autonomous navigation 310 can enable autonomous navigation of the vehicle along one or more various routes through one or more various environments, where autonomous navigation 310 determines and selects the routes along which the autonomous navigation 310 navigates vehicle 300. Autonomous navigation 310 controls various control elements 350 of a vehicle to autonomously direct (e.g., drive) the vehicle (herein referred to as "autonomously navigate", "autonomous navigation", etc.) along one or more portions of a route.

Autonomous navigation 310 may implement driving control 312 to perform decision making and direct actions with respect to control elements 350. For example, driving control 312 may develop one or more driving routes via which driving control 312 can navigate vehicle 300 through an environment, via control of one or more control elements 350. Driving control 312 can develop various driving routes which navigate vehicle 300 around static environmental elements in the environment and can associate various levels of risk with separate driving routes, based on weighted potential trajectories of various traffic participants through the environment. Driving control 312 can select a particular driving route along which driving control 312 navigates vehicle 300 based on a determination that the particular driving route has the least associated risk of the developed driving routes. In some embodiments, driving control 312 can reevaluate and revise associated risk of developed driving routes based on changes in the environment, including traffic participants navigating through the environment via various trajectories, and driving control 312 can switch from one selected driving route to another, alternate driving route based on a determination that the alternate driving route has a lower associated risk level that the driving route along which driving control 312 is presently navigating vehicle 300 through the environment.

Driving control 312 may develop, select, and change driving routes based on perception decisions determined by sensor data processing 314. Sensor data processing 314 may receive data from external sensors 320 and internal sensors 330. External sensors 320 may be sensors that can monitor one or more aspects of an external environment relative to vehicle 300. Such sensors can include camera devices, video recording devices, infrared sensor devices, radar devices, light-scanning devices including LiDAR devices, precipitation sensor devices, ambient wind sensor devices, ambient temperature sensor devices, one or more global navigation satellite system devices (e.g., GPS/DGPS, BeiDou, DORIS, Galileo, GLONASS, etc.) or some combination thereof, or the like. Internal sensors 330 may monitor the state of vehicle 300, including inertial measurement sensors, like an accelerometer, odometer, and angular rate sensors (e.g., gyroscopes), some combination thereof, or the like. Generally, external sensors 320 and internal sensors 330 can capture or generate sensor data for vehicle 300 to navigate through the environment, providing captured sensor data to sensor data processing 314.

Driving control 312 may direct control actions to control elements 350 in order to navigate vehicle 300 along a route. Control elements 350 may include, but are not limited to steering control elements, throttle control elements, braking control elements, or transmission control elements, each of which may be operated independently of control element input commands from a user of vehicle 300. Autonomous navigation 310 can include active control of control elements 350 while enabling manual override of control of elements 350 via manual input from a user via user interaction with one or more user interfaces 340 included in the vehicle. For example, autonomous navigation 310 can autonomously navigate vehicle 300 in the absence of input commands from a vehicle user via one or more user interfaces 340 of vehicle 300, and autonomous navigation 310 can cease control of one or more elements 350 in response to a user-initiated input command to the one or more elements 350 from one or more user interfaces 340 of vehicle 340.

As noted above, vehicle 300 can include one or more sets of interfaces 340. One or more interfaces 340 can include one or more user interface devices, also referred to as user interfaces, with which a user of vehicle 300 can interact to interact with one or more portions of autonomous navigation 310, control elements 350, etc. For example, an interface 340 can include a display interface with which a user can interact to command autonomous navigation 310 to engage autonomous navigation of vehicle 300 along one or more particular routes, based at least in part upon one or more virtual characterizations of one or more portions of the route.

In some embodiments, one or more interfaces 340 includes one or more communication interfaces which can communicatively couple autonomous navigation 310 with one or more remote services, systems, etc. via one or more communication networks (not illustrated). For example, an interface 340 can include a wireless communication transceiver which can communicatively couple autonomous navigation 310 with one or more remote services via one or more wireless communication networks, including a cloud service. In some embodiments, data can be received from one or more externally-located systems via a system other than a communication network. For example, a vehicle can transmit data to another vehicle via flashing one or more lights on the vehicle, and the other vehicle can receive and process such data via a camera device which captures and processes the light flashes. Autonomous navigation 310 can communicate virtual route characterizations, various sets of input data, etc. to a remote service, system, etc. via one or more interfaces 340, receive virtual characterizations of one or more roadway portions, etc. from the one or more remote services, systems, etc., and the like.

Sensor data processing 314 may implement multiple processing pipelines to process captured sensor data, make perception decisions according to the captured sensor data, and provide perception decisions to driving control 312. As noted above, sensor data captured and/or processed as part of one sensor processing pipelines may be shared across one or more other pipelines. The sharing of sensor data may allow for the strengths of some sensor modalities to be matched with and/or correct the weaknesses of other sensor modalities at various stages of sensor data processing. LiDAR, for instance, may generate better perception decisions in low-light scenarios than image data captured by a video camera. FIG. 4 illustrates a logical block diagram of an image sensor processing pipeline and a LiDAR sensor processing pipeline that perform object classification using shared sensor data across processing pipelines, according to some embodiments.

Image sensor 410 may capture a stream of image data, represented as a stream of pixel data that is assembled into image frames or stills that can be individually processed as part of image data processing pipeline 402. Image data processing pipeline 402 may implement various processing stages, such as region of interest masking 412, vision feature extraction 414, feature fusion 416, and multi-modal classifier 418 to detect and classify objects based on capture image data received from image sensor 410. For example, region of interest masking 412 may determine which portions of an image frame can be masked or excluded from evaluation for objects. If, for instance, a vehicle is traveling along a roadway, some environmental features may be irrelevant to the determination of driving actions, and therefore may not include objects to be considered. Areas of an image frame which depict sky, buildings, or other scenery may, for instance, be masked in order to reduce the processing burden.

As depicted by the arrow from point transformation 432 to region of interest masking, sensor data captured by LiDAR sensor 420 may be shared from LiDAR data processing pipeline 404. For example, point clustering 422 may evaluate distance measures captured by LiDAR sensor 420 to determine clusters of points, which may indicate or be associated with a single object (or set of objects) in the environment. Point transformation 432 may determine coordinate mappings for the distance measures which translate the distance mappings into the coordinate space of the image frames captured by image sensor. In this way, the depth measurements which may be determined by the distance measures can be paired or registered with objects in the image data, which can optimize the performance of masking or other operations in image data processing pipeline 402. For example, if some portions of an image frame were to be determined to be beyond some distance threshold from the vehicle, then those portions of the image frame may also be masked.

Vision feature extraction stage 414 may implement various computer vision techniques to identify features (e.g., edges, corners, colors, edge orientations, blobs, or ridges) within image frames. For example, integral channel features (ICF) may be performed to determine multiple registered image channels (e.g., color, grayscale, linear filters, Gaussian filters or other filters, pointwise transformations, or histogram of oriented gradients (HOG)) from an input image. In some embodiments, motion features may be detected (e.g., based on optical flow evaluations) of an image frame. Vision feature extraction stage 414 may generate a feature vector other data structure of extracted features, in various embodiments. The extracted features may be provided to feature fusion stage 416 and, as discussed below, shared with LiDAR data processing pipeline 404 as part of vision classifier 442.

Feature fusion stage 416 may receive extracted features from vision feature extraction and fuse the features extracted with features extracted by LiDAR feature extraction 424. For example, feature fusion 416 may combine the features into a single or common data structure (e.g., a matrix) for evaluation at later stages. In some embodiments, feature fusion 416 may align or register the features extracted by vision feature extraction 414 with the features extracted by LiDAR feature extraction 424. Further data transformations, such as down-sampling image data to a lower resolution in order to correspond better with sparser LiDAR data may also be performed.

Multi-modal classifier 418 may evaluate the combined sensor data from image sensor 410 and LiDAR sensor 420 (e.g., the combined feature vectors, matrix, etc.) to classify objects detected within the environment. For example, multi-modal classifier 418 may implement various machine learning models to evaluate the combined data, such as support vector machines (SVM), boosting, random forest learning, neural networks, or deep neural networks (DNN) to detect and classify objects based on the combined features provided as input. For example, offline training may be performed to develop classification models based on the different learning techniques, which can then be applied by multi-modal classifier 418 to make a detection and classification decision. The detection/classification decision may then be provided to final decision fusion stage 460.

LiDAR sensor 420 may capture distance measures with respect to various objects located within the environment for processing within LiDAR data processing pipeline 404. LiDAR data processing pipeline 404 may implement various stages, such as point clustering 422, point transformation 432, LiDAR feature extraction 424, LiDAR classifier 444, vision classifier 442, and classifier fusion 426, to detect and classify objects based on distance measures captured by LiDAR sensor 420. Point clustering stage 422 may be implemented to determine which distance measures are associated with a same object (e.g., by applying a nearest neighbor technique to group distance measures).

LiDAR feature extraction stage 424 may be implemented to determine features within LiDAR data, including clusters of distance measures. For example, in some embodiments, LiDAR feature extraction 424 may implement shape detection to analyze clusters of distance measures associated with the object to detect shapes, such as two-dimensional shapes (e.g., squares, circles, rectangles, or other polygons) or three-dimensional shapes (e.g., spheres, cylinders, cones, and cubes). In some embodiments, LiDAR feature extraction stage 424 may perform volume detection of objects. As with vison feature extraction 414, LiDAR feature extraction 424 may generate a feature vector other data structure of extracted features, in various embodiments. The extracted features may be provided to LiDAR classifier 44 and, as discussed above, shared with feature fusion sage 416 in image data processing pipeline 402.

LiDAR data processing pipeline 404 may also implement LiDAR classifier stage 444. LiDAR classifier stage 444 may be a weak classifier that is implemented using similar techniques to those discussed above with regard to multi-modal classifier 418 but based only LiDAR data. For example, LiDAR classifier 444 may implement various machine learning models to evaluate the features extracted from LiDAR data, such as support vector machines (SVM), boosting, random forest learning, neural networks, or deep neural networks (DNN) to detect and classify objects based on the features provided as input. Because LiDAR classifier 444 may be a weak classifier, LiDAR data processing pipeline 404 may also implement another classifier, vision classifier 442, to provide another weak classifier (e.g., based on vision features extracted from image data) so that the two weak classifiers may be combined at classifier fusion 426 to create a strong classifier for providing object detection and classification decisions. As with LiDAR classifier 444, vision classifier 442 may implement various machine learning models to evaluate the features extracted from image data, such as support vector machines (SVM), boosting, random forest learning, neural networks, or deep neural networks (DNN) to detect and classify objects based on the features provided as input.

Classifier fusion 426 can take classification decisions made by classifiers 442 and 444 and compare the decisions, for example, by averaging confidence values for the decisions to determine an averaged confidence value for the object classification. If different classifications are provided, in some embodiments, classifier fusion 426 may select one decision with a higher confidence value but provide detection classification decisions to final decision fusion 460 with a different confidence value by reducing the confidence value of the classification decision provided to final decision fusion 460.

Final decision fusion 460 may receive the decisions of the different pipelines 402 and 404 in order to determine a final detection classification decision. Final decision fusion may implement voting schemes, weighting schemes, averaging schemes, or other decision making techniques to combine or reconcile decisions of the pipelines. For example, if the decisions provided by the pipelines both have very low confidence values (e.g., below a confidence floor), then final decision fusion may not report a decision or modify the decision. The final decision may be output as an object label and bounding box, describing the location of the object.

Note that the previous discussion is not intended to be limiting as to the numerous ways in which sensor data may be shared across processing pipelines at different stages. FIG. 4, for instance, illustrates sharing a different stages or levels within a hierarchy of determinations based on sensor data (e.g., raw data decisions, processed data decisions, or feature-based decisions). However, other sensor data could also be shared. For example, radar data indicating an object's velocity could be provided as input to a classifier in one of the pipelines 402 or 404, or to final decision fusion 460 which might change the classification (e.g., by knowing that some objects have specific velocity ranges).

Figure 2:
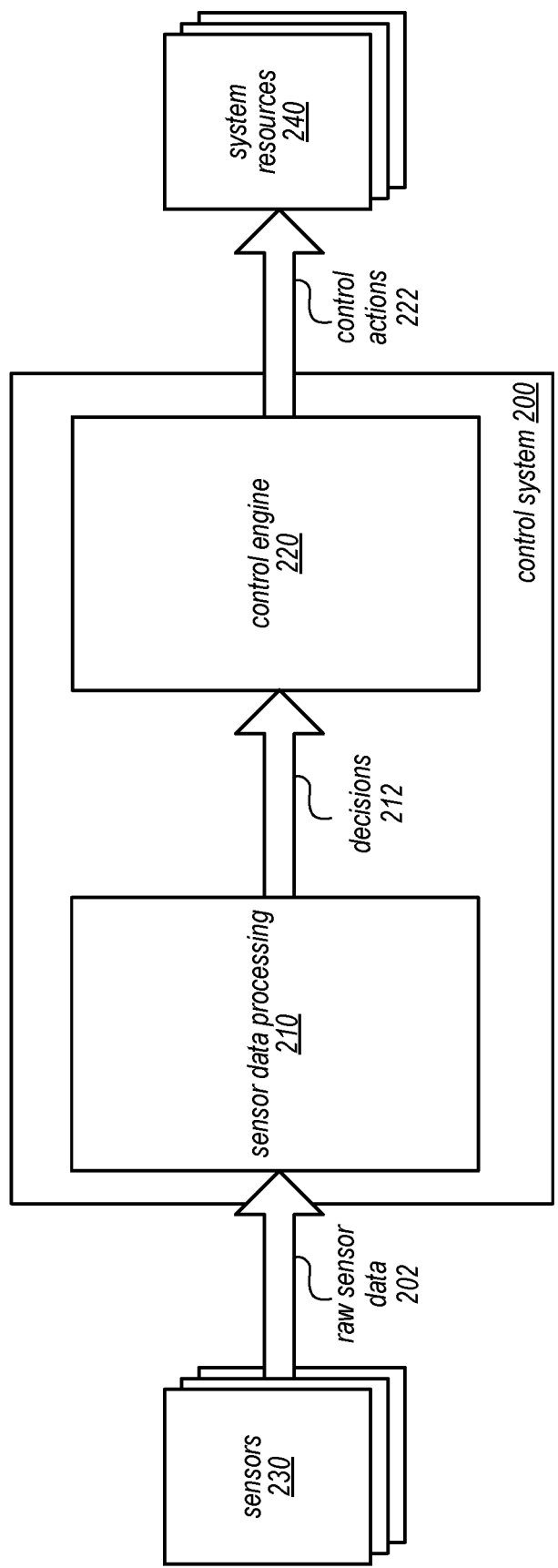
FIG. 2 illustrates a logical block diagram of a control system that perform sensor data processing using shared sensor data across processing pipelines, according to some embodiments.
Figure 4:
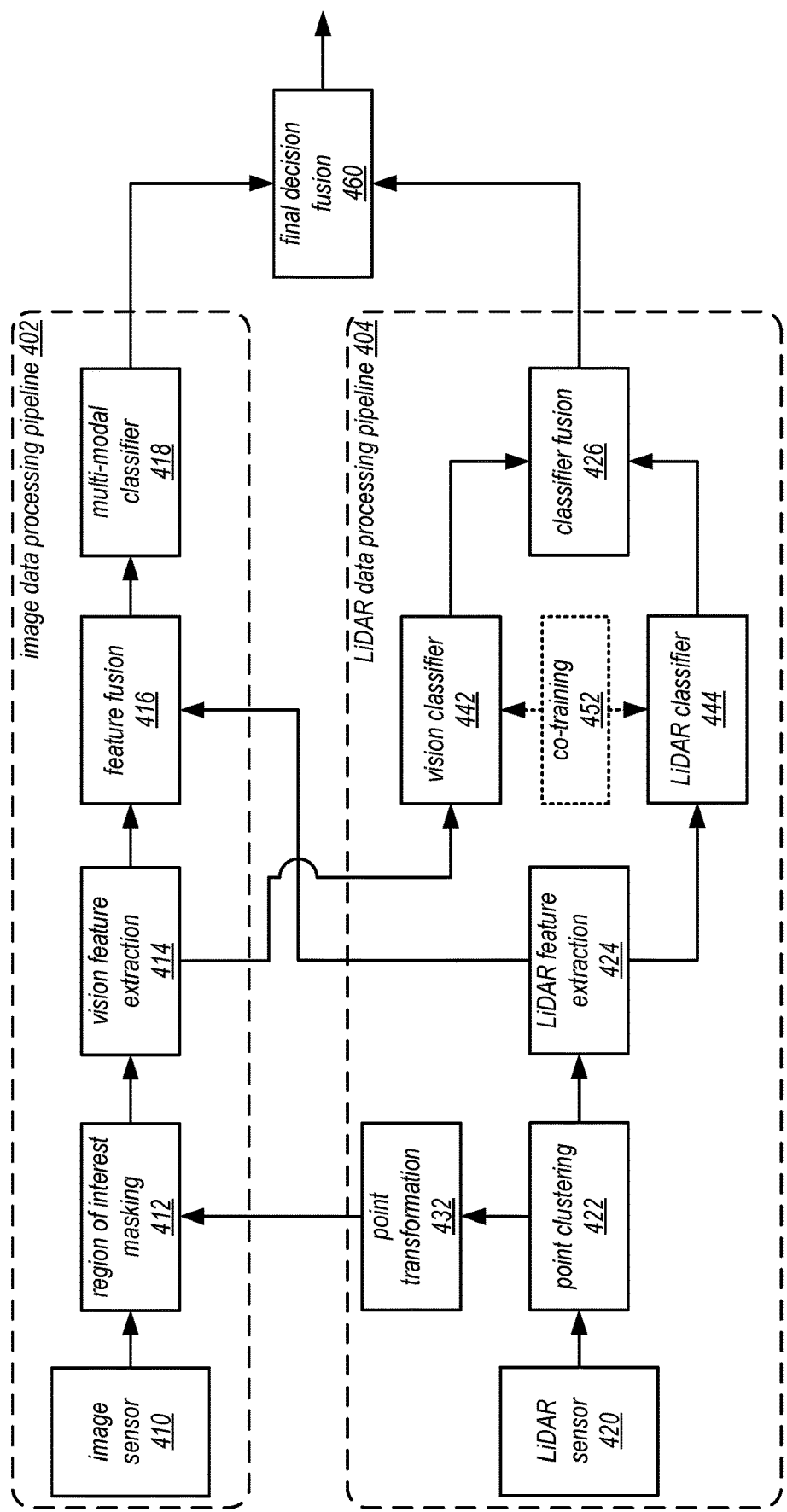
FIG. 4 illustrates a logical block diagram of an image sensor processing pipeline and a LiDAR sensor processing pipeline that perform object classification using shared sensor data across processing pipelines, according to some embodiments.
Figure 5:
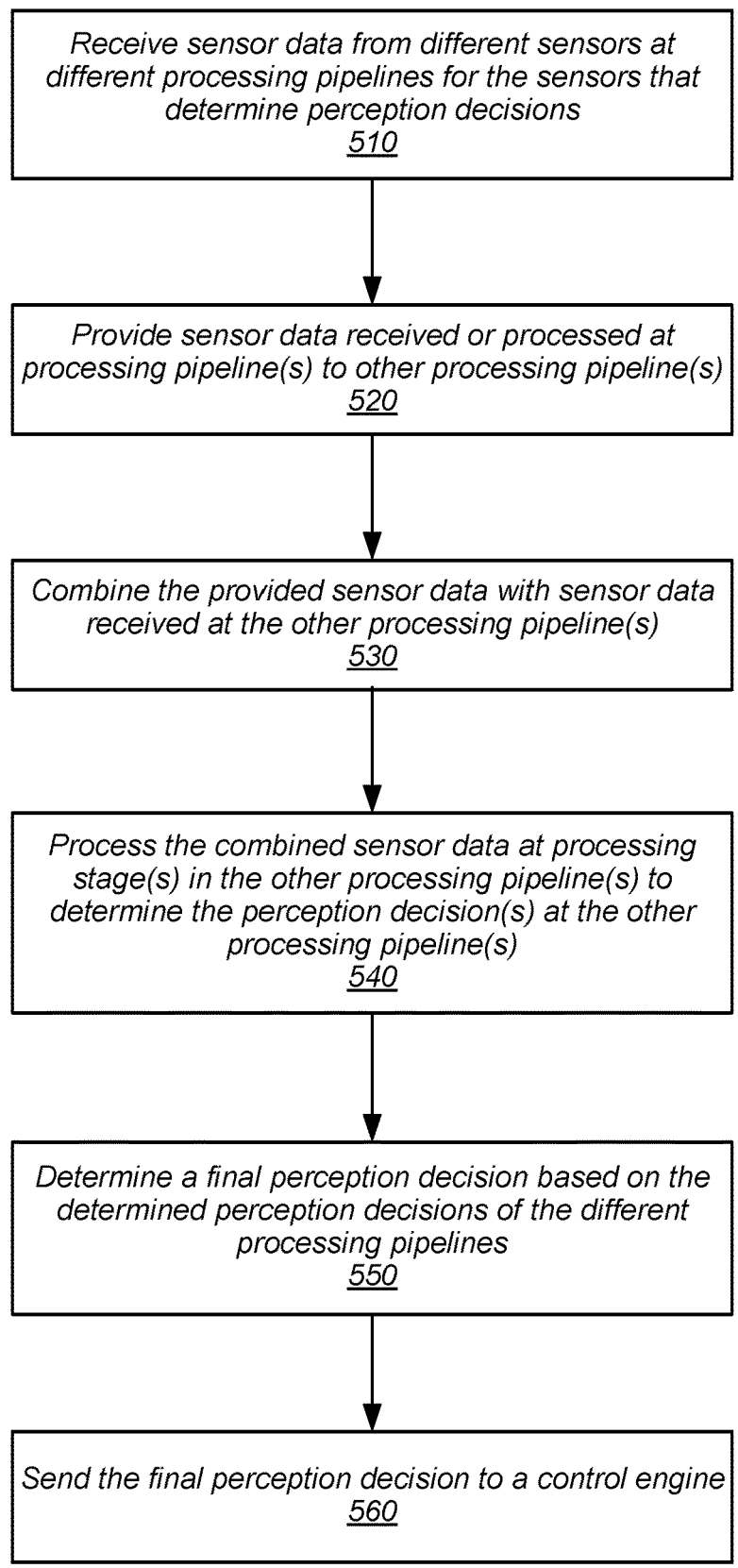
FIG. 5 is a high-level flowchart illustrating various methods and techniques to implement shared sensor data across processing pipelines, according to some embodiments.

FIGS. 2-4 provide examples of a control system, such as an autonomous navigation system for a vehicle, that may implement shared sensor data across processing pipelines. However, numerous other types or configurations of control systems (including other types and configurations of autonomous navigation systems) implement sensors that capture data for processing which may be shared across processing pipelines. FIG. 5 is a high-level flowchart illustrating various methods and techniques to implement shared sensor data across processing pipelines, according to some embodiments. The various components described above may implement these techniques as well as various other systems.

As indicated at 510, sensor data may be received from different sensors at different processing pipelines for the sensors that determine perception decisions. For example, an image data sensor may transmit captured image data to an image data processing pipeline, whereas an infrared sensor may transmit captured infrared data to an infrared processing pipeline. Different processing pipelines may determine the same (or in some cases different) perception decisions based on the received sensor data, implementing one or multiple different processing stages. Perception decisions may be determined according to various perception techniques. Perception techniques may include various techniques to interpret sensor data for an environment, including computer vision, machine hearing, and machine touch. In computer vision, for instance, detection of objects within an environment, classification of the objects, and tracking of the objects may be performed in order to direct the actions of a system in response to objects in the environment.

As indicated at 520, in various embodiments, sensor data received or processed at one or more processing pipelines may be provided to combinations of another one or more processing pipelines. For instance, LiDAR data may be captured and provided to an image data processing pipeline and an infrared data processing pipeline (e.g., but not to an auditory data processing pipeline). The sensor data may be in various forms, raw sensor or data without any processing performed, processed sensor data (e.g., formatted, converted, or transformed), and/or data derived from the sensor data (e.g., extracted features or decisions). The differing types of sensor data need not be provided to the same processing stage. For instance, raw sensor data could be provided to a decision processing stage that processes features extracted from other sensor data.

As indicated at 530, the provided sensor data may be combined with sensor data received at the other processing pipeline(s), in some embodiments. For example, common data structures (e.g., single vectors, matrices, arrays, etc.) may be populated with the provided sensor data and the originally received sensor data). Combining sensor data may also result in transforming the data (e.g., averaging values, correcting, warping, or skewing sensor data according to other sensor data). In some embodiments, the resolution of sensor data may be changed (e.g., by down sampling, blurring, or filtering the sensor data). Combining sensor data may also be implemented by pairing, registering, co-locating, or otherwise annotating one set of sensor data by another.

The combined sensor data may be processed at other processing stage(s) in the other processing pipeline(s) to determine the perception decision(s) at the other processing pipelines, as indicated at 540, in some embodiments. For example, raw sensor data combined with other raw sensor may be processed through various stages to detect objects, classify objects, and/or track objects. In at least some embodiments, the combined sensor data may be utilized by an individual processing pipeline prior to providing a processing decision to a final decision fusion performed based on multiple decisions, as discussed at 550 below.

As indicated at 550, a final perception decision may be determined based on the perception decisions of the different processing pipelines, in some embodiments. For example, a classification label and bounding box provided by multiple pipelines for an object may be evaluated in order to select a definitive classification label and bounding box. Various evaluation and combination schemes may be performed to fuse the different perception decisions into a final perception decision. As noted above, voting schemes, weighting schemes, averaging schemes, or other decision making techniques may be performed to combine or reconcile decisions of the pipelines. Confidence values and other metadata describing the respective perception decisions of the different processing pipelines may be implemented. Additional, machine learning models may also be used to determine the final decision based on the input perception decisions.

Once determined, the final perception decision may be provided to a control engine, such as control engine 220 or driving control 312 in FIGS. 2 and 3. Control actions may be performed (or not performed) based on the perception decision.

Figure 6:
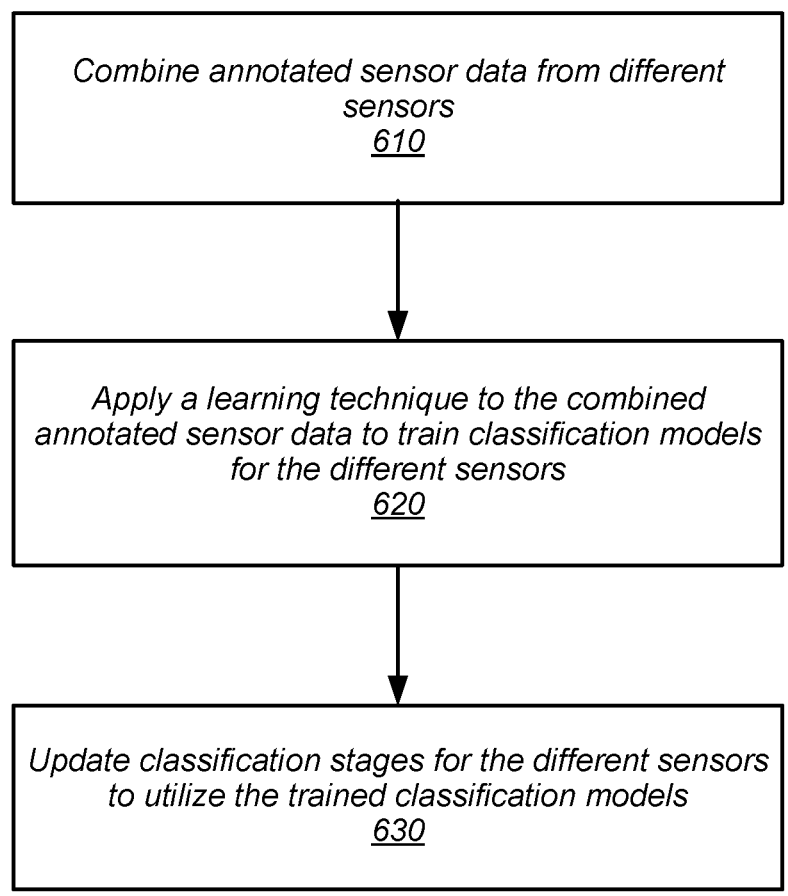
FIG. 6 is a high-level flowchart illustrating various methods and techniques to co-train classification models for classification stages implemented in a sensor processing pipeline, according to some embodiments.

Because sensor data is shared across processing pipelines, machine learning models used to perform various evaluation techniques (e.g., feature extraction or object classification) may be trained to consider the shared data that is available in the pipeline. FIG. 6 is a high-level flowchart illustrating various methods and techniques to co-train classification models for classification stages implemented in a sensor processing pipeline, according to some embodiments.

For example, as indicated at 610, annotated sensor data used to train classification models for different sensors may be combined. As illustrated in FIG. 4, LiDAR sensor data and image sensor data may be combined an annotated with the correct classifications for the different pairs of image and LiDAR sensor data. Once combined, a learning technique may be applied to the combined annotated sensor data to train classification models for the different sensors, such as models for LiDAR classification and image data classification. If, for instance, DNN models are implemented for classifying the objects using LiDAR and image data, convolutional training techniques may be applied to determine the respective weights of the neural pathways in the DNN models using the same training data set, the combined, annotated sensor data. Once the classification models have been trained, the classification stages for the different sensors may be updated to utilize the trained classification models, as indicated at 630. While training is often performed offline, in at least some embodiments, on-line training techniques applying utilizing combined annotated sensor data may be employed in control systems that share sensor data across processing pipelines.

Figure 7:
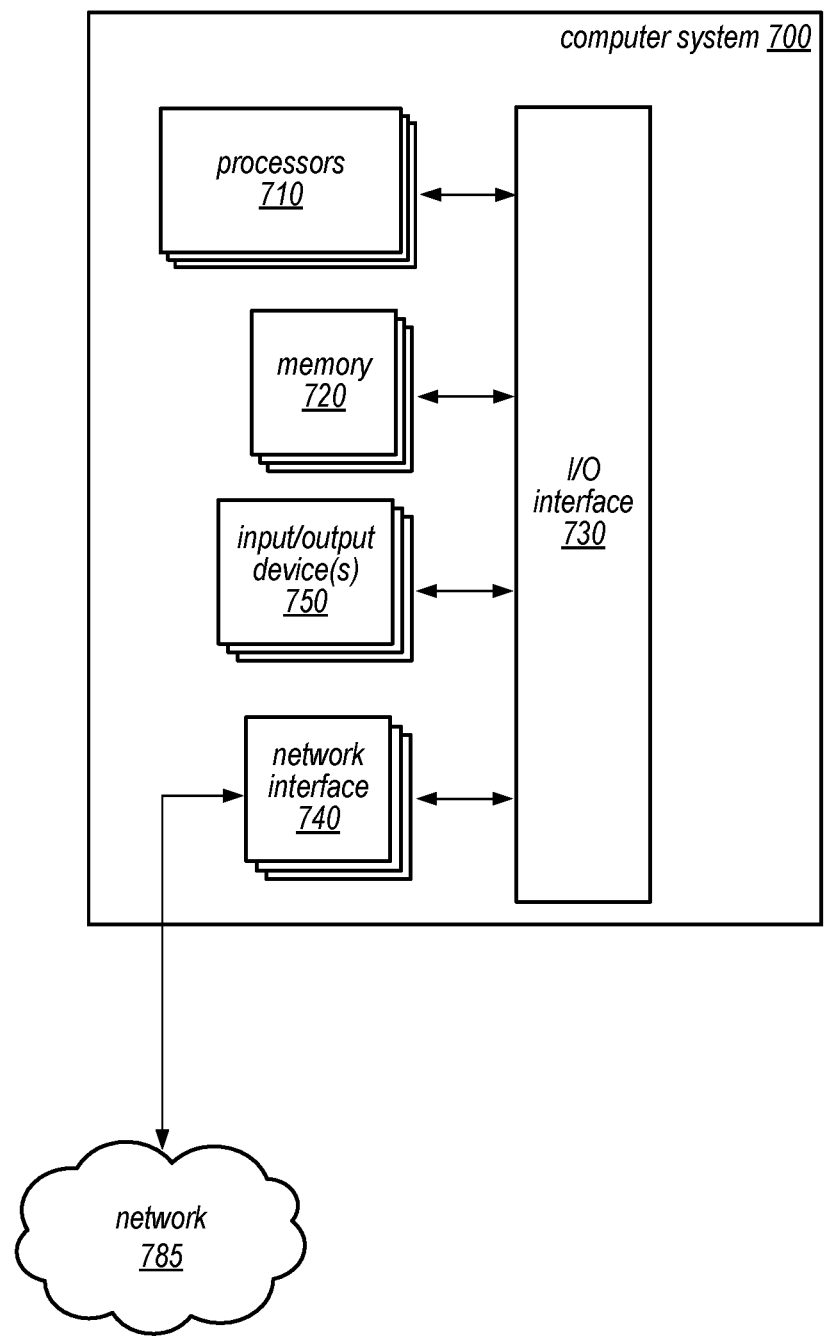
FIG. 7 illustrates a computer system that may be configured to include or execute any or all of the embodiments described herein.

FIG. 7 illustrates an example computer system 700 that may be configured to include or execute any or all of the embodiments described above. In different embodiments, computer system 700 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of automated capture of image data for points of interest may be executed in one or more computer systems 700, which may interact with various other devices. Note that any component, action, or functionality described above with respect to FIGS. 1 through 6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices, which can include one or more user interface (also referred to as "input interface") devices. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions, data, etc. accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 720 may be configured to implement some or all of an automated image capture system, incorporating any of the functionality described above. Additionally, existing control data of memory 720 may include any of the information or data structures described above. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 700. Multiple input/output devices may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
 a plurality of different sensors that capture respective sensor data;
 one or more devices configured to perform sensor data processing, the one or more devices comprising:
  different processing pipelines configured to determine perception decisions based, at least in part, on sensor data received from the plurality of sensors;
  wherein a first processing pipeline of the processing pipelines is configured to:
   determine a first perception decision based on first sensor data received from one or more of the different sensors having a first sensor type;
   determine a second perception decision based on second sensor data received from one or more of the different sensors having a second sensor type;
   determine a fused perception decision based on the first perception decision and the second perception decision; and
   send the first sensor data received or processed at the first processing pipeline to a second processing pipeline of the processing pipelines; and
  wherein the second processing pipeline is configured to:
   fuse the first sensor data sent from the first processing pipeline with the second sensor data received or processed at the second processing pipeline; and
   process the fused sensor data at one or more stages in the second processing pipeline prior to the determination of a perception decision at the second processing pipeline, wherein the perception decision at the second processing pipeline is based on the fused sensor data.

2. The apparatus of claim 1, wherein the first sensor data received or processed at the first processing pipeline that is sent to the second processing pipeline is raw sensor data received from the first sensor.

3. The apparatus of claim 1, wherein to process the fused sensor data at one or more stages in the second processing pipeline, the second processing pipeline is configured to determine a classification for one or more objects based on the fused sensor data.

4. The apparatus of claim 3, wherein the respective sensor data received or processed at the first processing pipeline that is sent to the second processing pipeline comprises one or more image features extracted from image sensor data at the first processing pipeline, wherein the second processing pipeline processes LiDAR sensor data received from a LiDAR device.

5. The apparatus of claim 1, wherein one of one or more processing stages at the first processing pipeline is a classification stage that applies a machine learning model trained on a same type of sensor data as the first sensor data that is sent to the second processing pipeline and a same type of sensor data as the second sensor data received at the second processing pipeline.

6. The apparatus of claim 1, wherein the one or more devices are configured to determine a final perception decision based, at least in part, on the perception decisions determined by the different processing pipelines.

7. The apparatus of claim 6, wherein the one or more devices are implemented as part of sensor data processing in an autonomous navigation system installed on a vehicle, and wherein the autonomous navigation system is configured to perform one or more navigation actions based, at least in part, on the final perception decision.

8. A method, comprising:
performing, by one or more computing devices:
receiving respective sensor data from a plurality of different sensors for processing at different processing pipelines to determine respective perception decisions at the different processing pipelines;
performing, at a first processing pipeline of the different processing pipelines:
determining a first perception decision based on first sensor data received from one or more of the different sensors having a first sensor type;
determining a second perception decision based on second sensor data received from one or more of the different sensors having a second sensor type;
determining a fused perception decision based on the first perception decision and the second perception decision; and
providing the first sensor data received or processed at the first processing pipelines to a second processing pipeline of the processing pipelines prior to determination of a respective perception decision at the second processing pipeline; and
performing, at a second processing pipeline of the different processing pipelines:
combining the provided sensor data with the second sensor data received from the second sensor at the second processing pipeline; and
processing the combined sensor data at one or more processing stages within the second processing pipeline, wherein the respective perception decision determined at the second processing pipeline is based, at least in part, on the combined sensor data.

9. The method of claim 8, wherein the first sensor data provided to the second processing pipeline are one or more features extracted from the first sensor data at the first processing pipeline.

10. The method of claim 9, wherein the one or more features extracted from the first sensor data at the first processing pipeline are one or more features extracted from LiDAR sensor data.

11. The method of claim 8, wherein processing the combined sensor data at the one or more processing stages within the second processing pipeline comprises classifying one or more objects based on the combined sensor data.

12. The method of claim 8, wherein the plurality of different sensors comprise at least one of an image sensor, a LiDAR sensor, an infrared sensor, a radar sensor, a global positioning satellite (GPS) sensor, inertial measurement sensor, or an angular rate sensor.

13. The method of claim 8, further comprising determining a final perception decision based, at least in part, on the perception decisions determined by the different processing pipelines.

14. The method of claim 13, further comprising sending the final perception decision to a control engine implemented as part of a control system.

15. A non-transitory, computer readable storage medium, storing program instructions that when executed by one or more computing devices cause the one or more computing devices to implement:
receiving respective sensor data from a plurality of different sensors for processing at different processing pipelines to determine respective perception decisions at the different processing pipelines;
performing, at a first processing pipeline of the different processing pipelines:
determining a first perception decision based on first sensor data received from one or more of the different sensors having a first sensor type;
determining a second perception decision based on second sensor data received from one or more of the different sensors, having a second sensor type;
determining a fused perception decision based on the first perception decision and the second perception decision; and
sending the first sensor data received or processed at the first processing pipeline, to the second processing pipeline that receives the second sensor data prior to the determination of the respective perception decision at the second processing pipeline; and
performing, at the second processing pipeline of the different processing pipelines:
fusing, at the second processing pipeline of the different processing pipelines, the provided first sensor data received or processed at the first processing pipeline, with the second sensor data received at the second processing pipeline; and
processing the fused sensor data at one or more processing stages within the second processing pipeline, wherein the respective perception decision determined at the second processing pipeline is based, at least in part, on the fused sensor data.

16. The non-transitory, computer readable storage medium of claim 15, wherein, in processing the fused sensor data at one or more processing stages within the second processing pipeline, the program instructions cause the one or more computing devices to implement classifying one or more objects based on the fused sensor data.

17. The non-transitory, computer readable storage medium of claim 16, wherein the respective sensor data received or processed at the first processing pipeline that is sent to the second processing pipeline is one or more image features extracted from image sensor data at the first processing pipeline, wherein the second processing pipeline processes LiDAR sensor data received from a LiDAR.

18. The non-transitory, computer readable storage medium of claim 15, wherein the program instructions cause the one or more computing devices to further implement:
sending the second sensor data received or processed at the second processing pipeline to the first processing pipeline;
fusing the sensor data received from the second processing pipeline with the first sensor data received from the first sensor at the first processing pipeline to generate other fused sensor data; and
processing the other fused sensor data at one or more processing stages within the first processing pipeline, wherein the respective perception decision determined at the first processing pipeline is based, at least in part, on the other fused sensor data.

19. The non-transitory, computer readable storage medium of claim 15, wherein the program instructions cause the one or more computing devices to further implement determining a final perception decision based, at least in part, on the perception decisions determined by the different processing pipelines.

20. The non-transitory, computer readable storage medium of claim 19, wherein the one or more computing devices implement an autonomous navigation system installed on a vehicle, and wherein the program instructions cause the one or more computing devices to further implement performing one or more navigation actions based, at least in part, on the final perception decision.

* * * * *